United States Patent [19]

Katayama et al.

[11] Patent Number: 5,376,973
[45] Date of Patent: Dec. 27, 1994

[54] IMAGE MEMORY DEVICE

[75] Inventors: Yoichi Katayama; Hidenobu Harasaki, both of Tokyo, Japan

[73] Assignee: NEC Corporation, Tokyo, Japan

[21] Appl. No.: 186,129

[22] Filed: Jan. 25, 1994

[30] Foreign Application Priority Data

Feb. 1, 1993 [JP] Japan .................................. 5-014376

[51] Int. Cl.⁵ .............................................. H04N 7/01
[52] U.S. Cl. ..................................... 348/714; 348/571; 348/443
[58] Field of Search ............... 348/714, 443, 448, 458, 348/459, 571, 581, 911; 358/140, 141, 183; H04N 7/01, 9/74

[56] References Cited

U.S. PATENT DOCUMENTS 4,776,025 10/1988 Hosoda ................. 348/714
4,998,167 3/1991 Jaqua ..................... 348/443

FOREIGN PATENT DOCUMENTS 60-21677 2/1985 Japan .

*Primary Examiner*—James J. Groody
*Assistant Examiner*—Sherrie Hsia

[57] ABSTRACT

An image memory device wherein data necessary for interpolation is read out simply and successively from a frame memory at a time without requiring a complicated timing control circuit to allow interpolation processing to be performed at a high speed. Image data are temporarily stored into a plurality of parallel frame memories having an interleave construction. Conversion addresses for the frame memories are generated based on different conversion rules from a plurality of address decoders and applied in parallel at a time to the frame memories so that data at neighboring points of a coordinate position for an object of interpolation are outputted at a time from the frame memories. The neighboring point data are inputted in parallel at a time, or pipeline inputted, to an interpolation calculation circuit so that coefficients are generated from individual pipelines. Product sum calculation is performed for the coefficients and the neighboring point data.

5 Claims, 7 Drawing Sheets

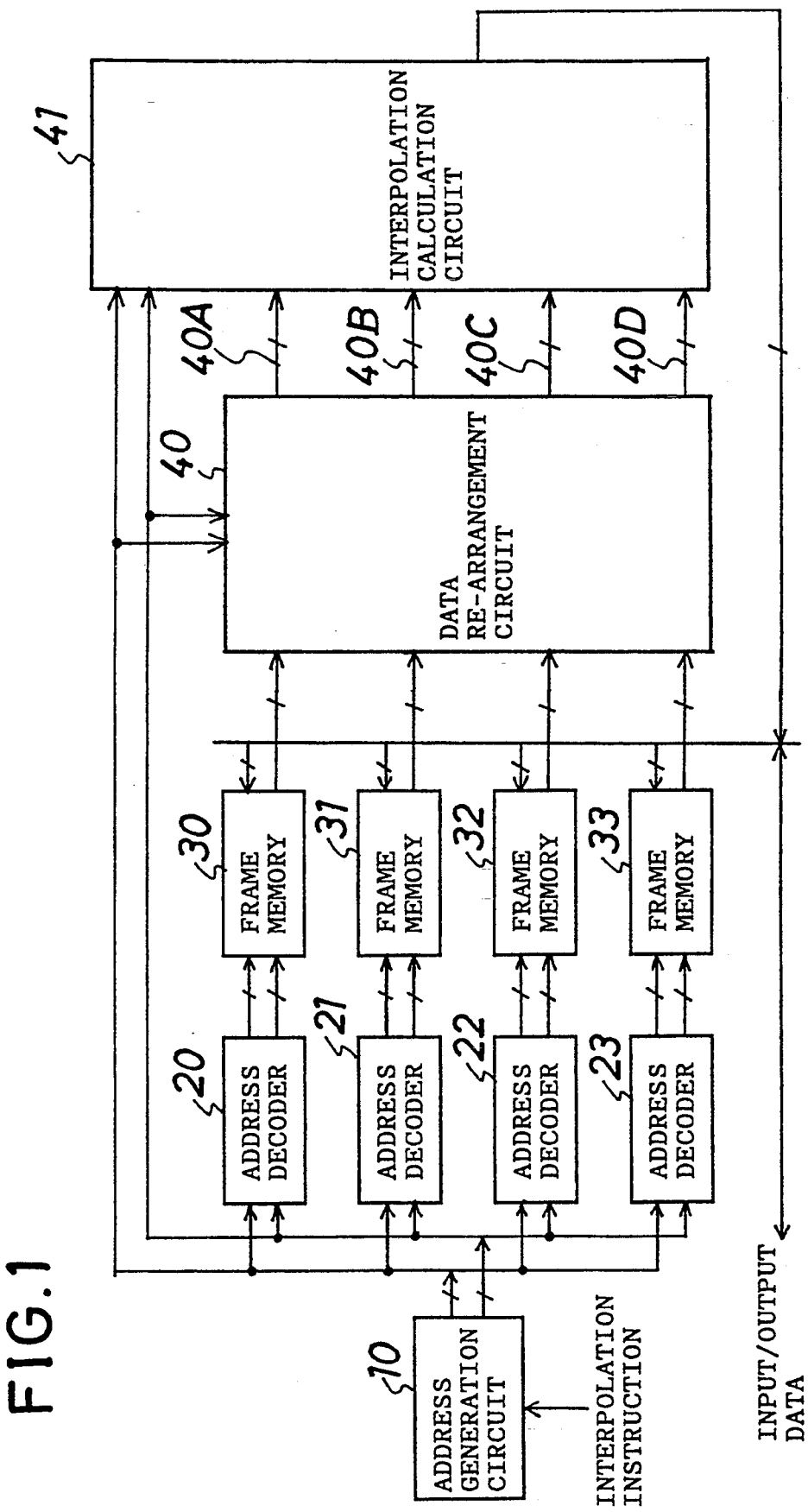

FIG.2

| | ADDRESS INTEGRAL PORTION | $x_0, y_0 = 0$ | $x_0, y_0 = 1$ |
|---|---|---|---|
| ADDRESS DECODER 20 | $X(=x_{n-1} \cdots x_0)$<br>$Y(=y_{n-1} \cdots y_0)$ | through<br>through | add++<br>add++ |
| ADDRESS DECODER 21 | $X(=x_{n-1} \cdots x_0)$<br>$Y(=y_{n-1} \cdots y_0)$ | through<br>add++ | add++<br>through |
| ADDRESS DECODER 22 | $X(=x_{n-1} \cdots x_0)$<br>$Y(=y_{n-1} \cdots y_0)$ | add++<br>through | through<br>add++ |
| ADDRESS DECODER 23 | $X(=x_{n-1} \cdots x_0)$<br>$Y(=y_{n-1} \cdots y_0)$ | add++<br>add++ | through<br>through |

FIG.3

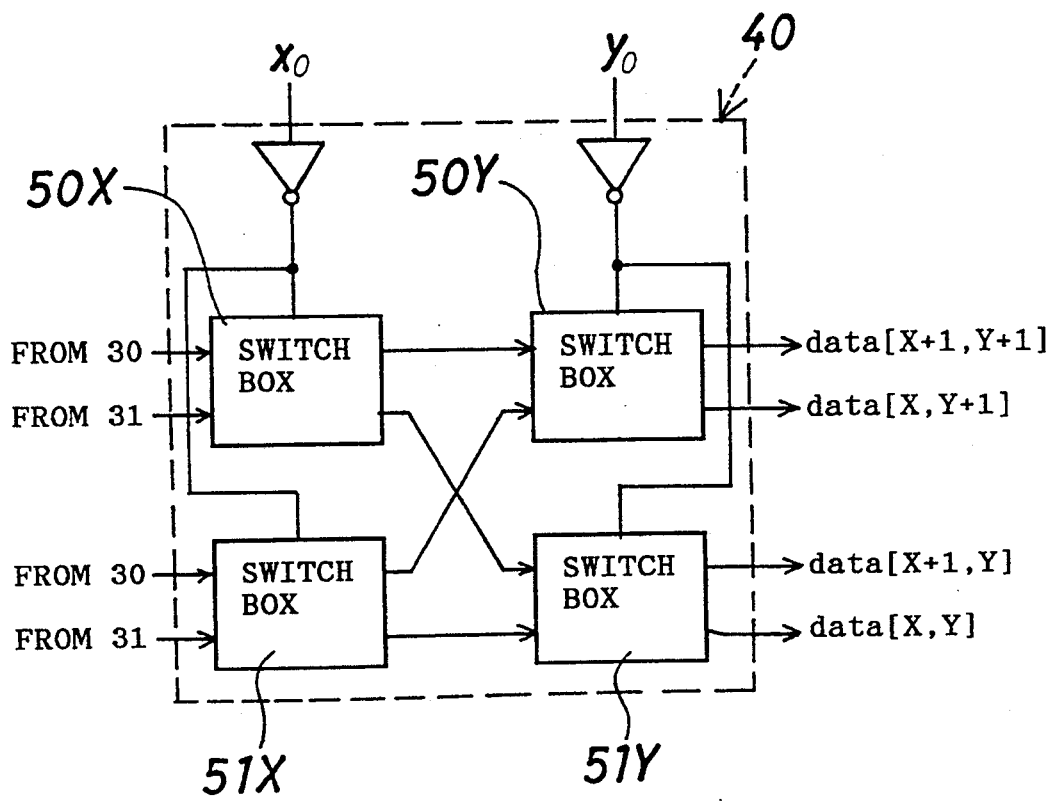

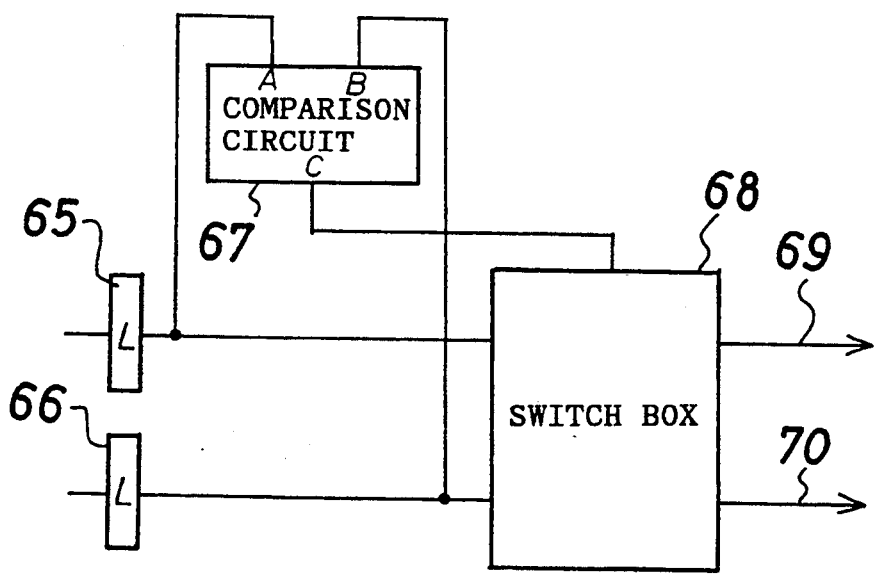

IMAGE MEMORY DEVICE

BACKGROUND OF THE INVENTION

1. Field of the Invention

This invention relates to an image memory device, and more particularly to an image memory device wherein interpolation data are successively obtained from a frame memory in order to process a moving picture image.

2. Description of the Related Art

A system wherein digital image data are read out from a frame memory while interpolation calculation is performed is conventionally known and disclosed, for example, in Japanese Patent Laid-Open Application No. Showa 60-21677. In the prior art system, a frame memory for storing image data includes an odd-numbered field memory for storing image data of odd-numbered lines and an even-numbered field memory for storing image data of even-numbered lines, and data are read out from the odd- and even-numbered field memories in such a manner that they are partially overlapped with each other in a horizontal direction and a vertical direction to allow data necessary for interpolation for neighboring points to be read out from the frame memory. Consequently, arbitrary coordinate data which are not stored in the frame memory can be obtained by interpolation processing, and accordingly, a conversion image of a high quality can be obtained.

The prior art system employs such a complicated reading out method that data are successively read out alternately from the odd- and even-numbered field memories of the frame memory for successive lines and image data are partially overlapped with each other for both of a horizontal direction and a vertical direction in order to perform interpolation calculation. Consequently, even upon, for example, simple interpolation calculation for four points, data must be read separately by second times for each line, and besides, reading out of data for different lines must be performed sequentially. Accordingly, it is impossible to read out data necessary for interpolation at a time and a long processing time for interpolation is required. Further, a timing control circuit for such complicated reading out operation as described above is required.

SUMMARY OF THE INVENTION

It is an object of the present invention to provide an image memory device wherein data necessary for interpolation can be read out simply and successively from a frame memory at a time without requiring a complicated timing control circuit to allow interpolation processing to be performed at a high speed.

In order to attain the object described above, according to an aspect of the present invention, there is provided an image memory device, which comprises an address generation circuit operable in response to an interpolation instruction inputted from the outside and including designation of a coordinate position for generating and outputting two-dimensional addresses corresponding to the coordinate position, a plurality of frame memories for temporarily storing image data at neighboring points around the coordinate position inputted from the outside and outputting, when conversion addresses are inputted thereto, those of the stored image data which correspond to the conversion addresses, a plurality of address decoders individually connected to the frame memories and connected commonly to the address generation circuit for converting the two-dimensional addresses inputted from the address generation circuit into addresses of the frame memories based on individually predetermined conversion rules different from one another and inputting the addresses obtained by the conversion parallelly to the corresponding ones of the frame memories at a time, and an interpolation calculation circuit for calculating and outputting interpolation data from the image data inputted at a time from the frame memories.

Preferably, the frame memories have an interleave construction which allows reading out and writing in units of a bank.

The interpolation calculation circuit may be replaced by a data re-arrangement circuit connected commonly to the frame memories for re-arranging the order of the image data outputted at a time from the frame memories into a predetermined order based on the conversion addresses designating the image data and outputting the thus re-arranged image data in parallel at a time, and another interpolation calculation circuit for inputting the image data outputted at a time from the data re-arrangement circuit and the two-dimensional addresses, performing interpolation calculation in accordance with a predetermined operation expression based on the two-dimensional addresses using the image data and outputting the thus obtained interpolation data, or by a further interpolation calculation circuit for re-arranging the image data inputted at a time from the frame memories in an ascending order or a descending order in terms of levels of them and outputting that one or those ones of the image data at a predetermined order number or numbers as interpolation data, or else by a still further interpolation calculation circuit for re-arranging the image data inputted at a time from the frame memories in an ascending order or a descending order in terms of levels of them and outputting an average value of a plurality of ones of the image data at predetermined order numbers as interpolation data.

In the image memory device, image data are temporarily stored into the parallel frame memories having an interleave construction. Conversion addresses for the frame memories are generated based on the different conversion rules from the address decoders and applied parallelly at a time to the frame memories so that data at neighboring points of a coordinate position for an object of interpolation are outputted at a time from the frame memories. The neighboring point data are inputted parallelly at a time, or pipeline inputted, to the interpolation calculation circuit so that coefficients are generated from the individual pipelines. Product sum calculation is performed for the coefficients and the neighboring point data in accordance with the predetermined operation expression or the image data outputted at a time from the frame memories are compared in magnitude, and in accordance with a result of the product sum calculation or the comparison, one or ones of the image data at a predetermined order number or numbers are selectively outputted or an average value of a plurality of ones of the image data at predetermined order numbers is calculated and outputted. Consequently, interpolation data for an intermediate coordinate position which is not stored in any of the frame memories can be obtained in a short time equal to one data access time.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram of an image memory device showing a preferred embodiment of the present invention;

FIG. 2 is a diagrammatic representation illustrating conversion rules for conversion addresses to be outputted from four address decoders of the image memory device shown in FIG. 1;

FIG. 3 is a block diagram showing detailed construction of a data re-arrangement circuit of the image memory device shown in FIG. 1;

FIG. 9 is a block diagram of a magnitude responsive re-arrangement circuit of the interpolation calculation circuit shown in FIG. 8; and FIG. 10 is a diagrammatic view illustrating a model of operation of a comparison circuit of the interpolation calculation circuit shown in FIG. 8.

DETAILED DESCRIPTION OF THE PREFERRED EMBODIMENTS

Figures 4A, 4B:
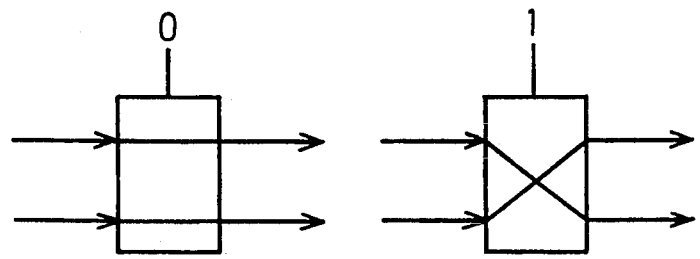
FIGS. 4(A) and 4(B) are diagrammatic views illustrating operation of a switch box of the data re-arrangement circuit shown in FIG. 3.

Referring first to FIG. 1, there is shown a general construction of an image memory device according to which the present invention is applied. It is to be noted that any line interconnecting different blocks which has a slanting line added thereto represents that a plurality of lines are actually present and are represented by the single line.

The image memory device shown in FIG. 1 is constructed so as to perform interpolation for four neighboring points and includes a single address generation circuit 10, four address decoders 20 to 23 connected in parallel to each other to the address generation circuit 10, four frame memories 30 to 33 connected in parallel to each other to the frame memories 30 to 33, respectively, a single data re-arrangement circuit 40 connected commonly to outputs of the frame memories 30 to 33, and an interpolation calculation circuit 41 connected to receive four outputs of the data re-arrangement circuit 40.

The address generation circuit 10 produces, when an interpolation instruction including designation of a coordinate position is inputted thereto from the outside of the image memory device, two-dimensional addresses corresponding to a coordinate for interpolation designated by the coordinate position, that is, an address in a horizontal direction (x direction) and an address in a vertical direction (y direction), and outputs the addresses at a time. The two-dimensional addresses are inputted to the address decoders 20 to 23, the data re-arrangement circuit 40 and the interpolation calculation circuit 41.

When the two-dimensional addresses outputted from the address generation circuit 10 are inputted, the four address decoders 20 to 23 individually produce, from the two-dimensional addresses thus inputted, addresses of four points regarding an interpolation object point in accordance with predetermined conversion rules, and output the thus produced addresses as conversion addresses at a time.

The frame memories 30 to 33 have an interleave construction which allows reading and writing in units of a bank, and store image data inputted thereto from the outside in synchronism with a system clock signal supplied thereto from the outside. Then, when conversion addresses are received from corresponding ones of the four address decoders 20 to 23, image data stored at the addresses are outputted at a time from the frame memories 30 to 33.

The data re-arrangement circuit 40 has four output systems 40A to 40D, and re-arranges image data inputted thereto at a time from the four frame memories 30 to 33 so that they may have an arrangement of an order determined from the conversion addresses, and then outputs the thus re-arranged four image data selectively from the four output systems 40A to 40D at a time.

The interpolation calculation circuit 41 receives such four image data inputted thereto at a time from the output systems 40A to 40D and two-dimensional addresses from the address generation circuit 10, and performs linear interpolation calculation with the thus received four image data and two-dimensional addresses to produce interpolation data and outputs the interpolation data.

FIG. 2 illustrates conversion rules for conversion addresses to be outputted from the four address decoders 20 to 23. Referring to FIG. 2, characters "X" and "Y" represent integral portions of two-dimensional addresses, that is, a coordinate value in the x direction (horizontal direction) and another coordinate value in the y direction (vertical direction) inputted from the address generation circuit 10 to any of the address decoders 20 to 23, respectively, and "$x_{n-1}, \ldots x_0$" in each parenthesis represents a value of such X as represented in binary notation while "$y_{n-1}, \ldots, y_0$" represents a value of such Y as represented in binary rotation. In this instance, $x_0$ and $y_0$ represent the LSBs (Least Significant Bits) and $x_{n-1}$ and $y_{n-1}$ represent the MSBs (Most Significant Bits). Further, "through" and "add++" represent outputting processing for X or Y which is a value of an inputted address. In this instance, "through" represents to output an input component as it is as a conversion address value, and "add++" represents to output an input component as a conversion address value after "1" is added to it.

Each of the address decoders 20 to 23 either outputs integral portions of two-dimensional address values (X, Y) for the x and y directions inputted thereto as they are or outputs such integral portions after "1" is added to them in accordance with the conversion rules illustrated in FIG. 2 depending upon whether the values of the LSBs of the integral portions of the two-dimensional address values (X, Y) are "0" or "1".

For example, if it is assumed that the two dimensional addresses inputted from the address generation circuit 10 to the address decoders 20 to 23 are "4.5" for the x direction and "5.5" for the y direction, then the value of X (the integral portion of the address value for the x direction) is "4", and since this is represented as "100" in binary notation, the LSB of the value of X is "0".

Consequently, the address decoder 20 outputs the integral portion "4" of the address input value "4.5" as it is as a conversion address value for the x direction. Further, since the value of Y is "5" and is represented as "101" in binary notation, the LSB of the value of Y is "1", and consequently, the address decoder 20 outputs "6", which is a value obtained by adding "1" to the integral portion of the input value "5.5", as a conversion address for the y direction. Meanwhile, the address decoder 21 outputs, for the address value for the x direction, the inputted integral portion "4" as it is and outputs, for the address value for the y direction, the inputted integral portion "5" as it is. Similarly, the address decoder 22 outputs "5" obtained by adding "1" to "4" as a conversion address value for the x direction and outputs "6" obtained by adding "1" to "5" as a conversion address for the y direction, and the address decoder 23 outputs "5" obtained by adding "1" to "4" as a conversion address for the x direction and outputs "5" as it is as a conversion address for the y direction.

Data such as, for example, moving picture image data for one screen are stored into each of the four frame memories 30 to 33 from the outside in accordance with coordinates (address) for displaying on a screen immediately before conversion addresses are inputted to the memories 30 to 33. When such conversion addresses as described above are inputted from the address decoders 20 to 23 to the corresponding ones of the frame memories 30 to 33, image data at corresponding addresses are read out. The image data thus read out are outputted in a pipeline condition (in parallel to each other) from the frame memories 30 to 33 at a time and inputted to the data re-arrangement circuit 40.

The image data outputted from the frame memories 30 to 33 can be represented in the following four forms where the integral portions of the addresses for the horizontal direction and the vertical direction are represented as X and Y, respectively:

data[X, Y]
data[X+1, Y]
data[X, Y+1]
data[X+1, Y+1]

However, image data of such four forms are not necessarily outputted from predetermined ones of the four frame memories 30 to 33 but may be outputted from different ones of them. For example, when two-dimensional addresses outputted from the address generation circuit 10 are "4.5" for the x direction and "5.5" for the y direction, conversion addresses outputted from the address decoder 20 are "4" for the x direction and "6" for the y direction, respectively, as described hereinabove, and they are addresses designating the data[X, Y+1]. In this instance, since conversion addresses from the address decoder 21 are "4" for the x direction and "5" for the y direction, they designate the data[X, Y]; since conversion addresses from the address decoder 22 are "5" for the x direction and "6" for the y direction, they designate the data[X+1, Y+1]; and since conversion addresses of the address decoder 23 are "5" for the x direction and "5" for the y direction, they represent the data [X+1, Y].

On the other hand, when the two-dimensional addresses outputted from the address generation circuit 20 are "5.5" for the x direction and "6.5" for the y direction, since the conversion addresses outputted from the address decoder 20 are "6" for the x direction and "6" for the y direction, they are addresses designating the data [X+1, Y]. In this instance, the address decoder 21 designates the data[X+1, Y+1]; the address decoder 22 designates the data[X, Y]; and the address decoder 23 designates the data[X, Y+1].

Thus, the data re-arrangement circuit 40 rearranges image data outputted in such four forms as described above from the four frame memories 30 to 33 so that the data[X+1, Y+1] are outputted normally from the output terminal 40A; the data[X, Y+1] are outputted normally from the output terminal 40B; the data[X+1, Y] are outputted normally from the output terminal 40C; and the data[X, Y] are outputted normally from the output terminal 40D, with such circuit configuration as hereinafter described.

Accordingly, when the two-dimensional addresses outputted from the address generation circuit 10 are "5.5" for the x direction and "6.5" for the y direction as in the example described above, the data re-arrangement circuit 40 re-arranges the outputs of the frame memories 30 to 33 such that the addresses from the frame memory 30 are introduced to the output terminal 40C; the outputs of the frame memory 31 are introduced to the output terminal 40A; the outputs of the frame memory 32 are introduced to the output terminal 40D; and the outputs of the frame memory 33 are introduced to the output terminal 40B.

The data re-arrangement circuit 40 is shown in FIG. 3. Referring to FIG. 3, the data re-arrangement circuit 40 includes a pair of switch boxes 50X and 51X whose connections between two input terminals and two output terminals are switched depending upon whether the LSB for the x direction of the two-dimensional addresses from the address generation circuit 10 is "0" or "1", and another pair of switch boxes 50Y and 51Y whose connections between two input terminals and two output terminals are switched depending upon whether the LSB for the y direction is "0" or "1". The switch box 50X inputs image data from the frame memories 30 and 31, and the switch box 51X inputs image data from the frame memories 32 and 33. One of the output terminals of the switch box 50X is connected to one of the input terminals of the switch box 50Y, and one of the output terminals of the switch box 51X is connected to one of the input terminals of the switch box 51Y. The other output terminal of the switch box 51X is connected to the other input terminal of the switch box 50Y, and the other output terminal of the switch box 50X is connected to the other input terminal of the switch box 51Y.

Figure 5:
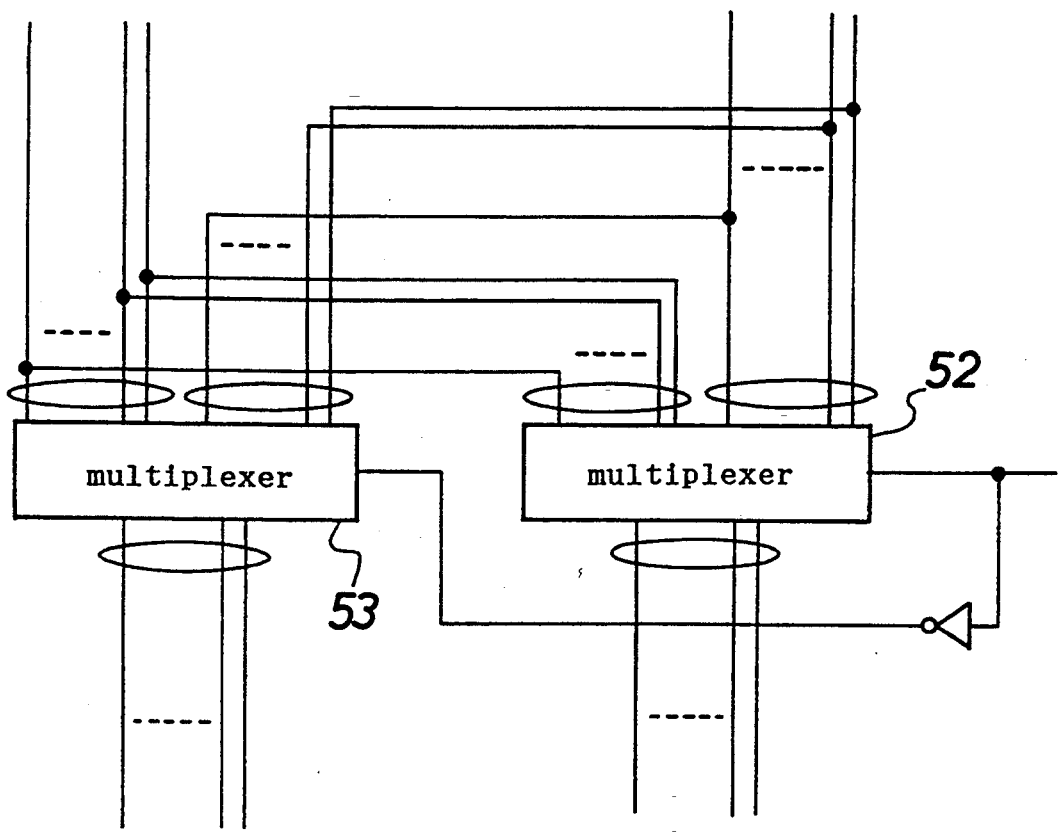
FIG. 5 is a block diagram of a switch box of the data re-arrangement circuit shown in FIG. 3.

Each of the switch boxes 50X, 50Y and 51X, 51Y connects the two inputs thereof in parallel to the two outputs thereof as seen in FIG. 4(A) when the control signal is "0", that is, when the LSB described above is "0", but connects the two inputs thereof in a crossing relationship to the two outputs thereof as seen in FIG. 4(B) when the control signal is "1", that is, when the LSB is "1". The switch boxes which operate in such a manner described just above can each be constructed, for example, using a multiplexer such as a pair of multiplexers 52 and 53 as shown in FIG. 5.

The interpolation calculation circuit 41 inputs four image data re-arranged in such a manner as described above by the data re-arrangement circuit 40 at a time, extracts dx and dy which are decimal portions or two-dimensional addresses for the x and y directions outputted from the address generation circuit 10, performs such product sum calculation which is linear interpolation calculation as given by the following expression (1), and outputs data[x, y] as interpolation data obtained by the interpolation calculation:

$$\text{data}[x,y] = dx \cdot dy \cdot \text{data}[X + 1, Y + 1] + \\ (1 - dx) \cdot dy \cdot \text{data}[X, Y + 1] + dx \cdot (1 - dy) \cdot \\ \text{data}[X + 1, Y] + (1 - dx) \cdot (1 - dy) \cdot \text{data}[X, Y] \quad (1)$$

where X and Y are integral portions of two-dimensional addresses for the x and y directions outputted from the address generation circuit 10 and dx and dy are decimal portions of the two-dimensional addresses, respectively, as described hereinabove.

Figure 6:
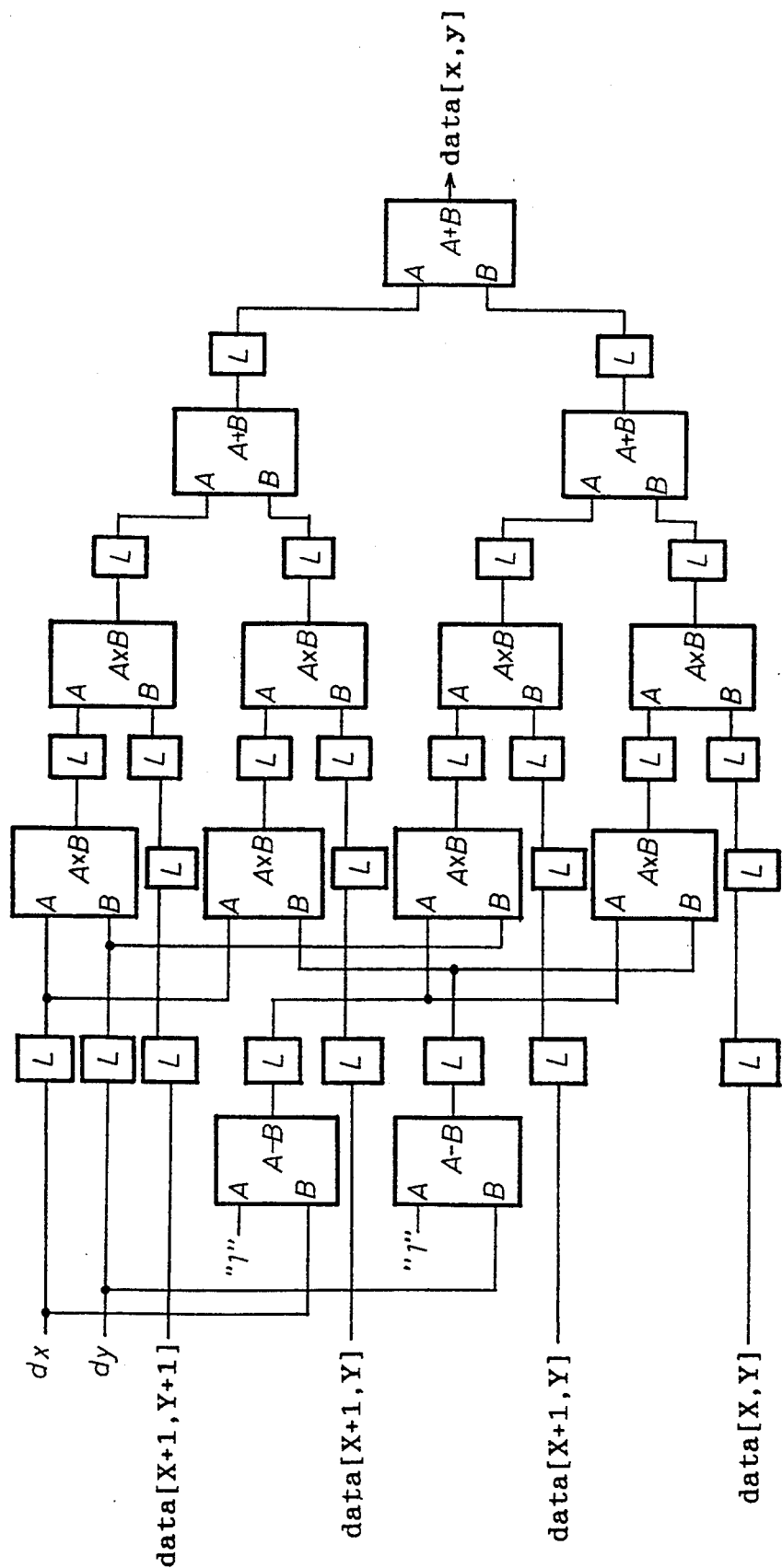
FIG. 6 is a block diagram of an interpolation calculation circuit of the image memory device shown in FIG. 1.

FIG. 6 shows a detailed circuit construction of the interpolation calculation circuit 41 which performs such interpolation calculation as described above. In FIG. 6, character "L" in any block denotes a latch circuit; "A−B" denotes a subtraction circuit; "A+B" denotes an addition circuit; and "A×B" denotes a multiplication circuit.

In the image memory device shown in FIG. 1, since linear interpolation of data based on coordinates of data is involved, image data outputted from the frame memories 20 to 23 and two-dimensional addresses outputted from the address generation circuit 10 are inputted to determine to which coordinate positions the image data from the frame memories 20 to 23 correspond, whereafter the image data are inputted to the interpolation calculation circuit 41. Therefore, the data re-arrangement circuit 40 is required.

Further, interpolation of four neighboring points described above includes two special cases including a case wherein conversion addresses correspond just to a crossing point of coordinates and the other case wherein conversion addresses correspond to a side defined by two data. In those instances, either dx=0 and dy=0 or one of dx and dy is 0, and as can be seen from the linear interpolation equation (1) given hereinabove, a correct result can be obtained without any modification to the circuit shown in FIG. 6.

On the other hand, it is also possible to perform linear interpolation based on data of an arbitrary number of neighboring points equal to 3 or equal to or greater than 5. In this instance, a number of address decoders and frame memories equal to the number of the neighboring points should be used and predetermined linear interpolation should be performed by an interpolation calculation circuit after image data from the frame memories are re-arranged in accordance with addresses by a data re-arrangement circuit.

Figure 7:
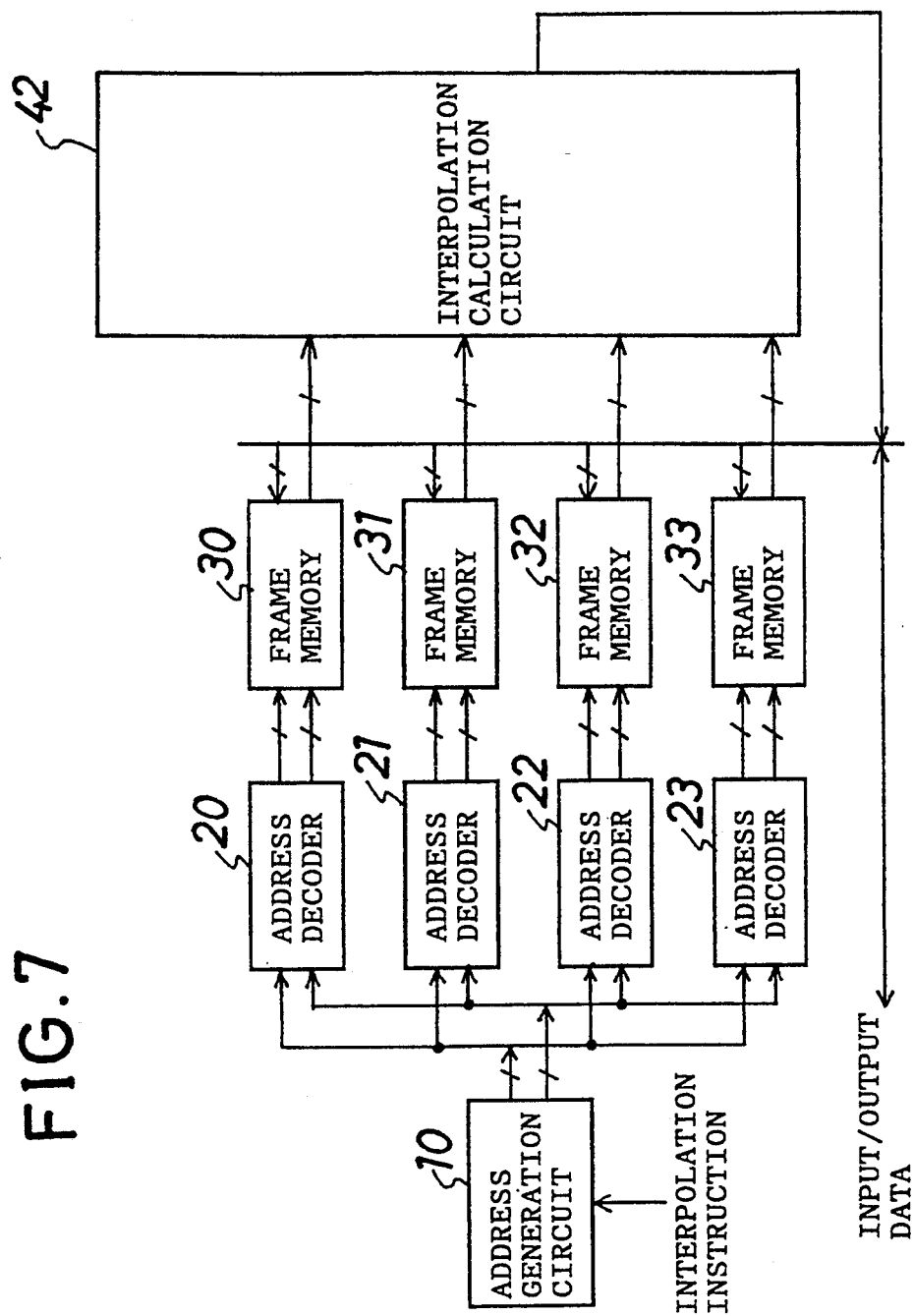
FIG. 7 is a block diagram of another image memory device showing a second preferred embodiment of the present invention.

FIG. 7 shows another image memory device which performs interpolation for four surrounding neighboring points according to a second preferred embodiment of the present invention. Referring to FIG. 7, the image memory device shown is common in construction to the image memory device shown in FIG. 1 in that it includes a single address generation circuit 10, four address decoders 20 to 23 and four frame memories 30 to 33, but is different in that it does not include the data re-arrangement circuit 40 of the image memory device of FIG. 1 and includes another interpolation calculation circuit 42 in place of the interpolation calculation circuit 41.

Figure 8:
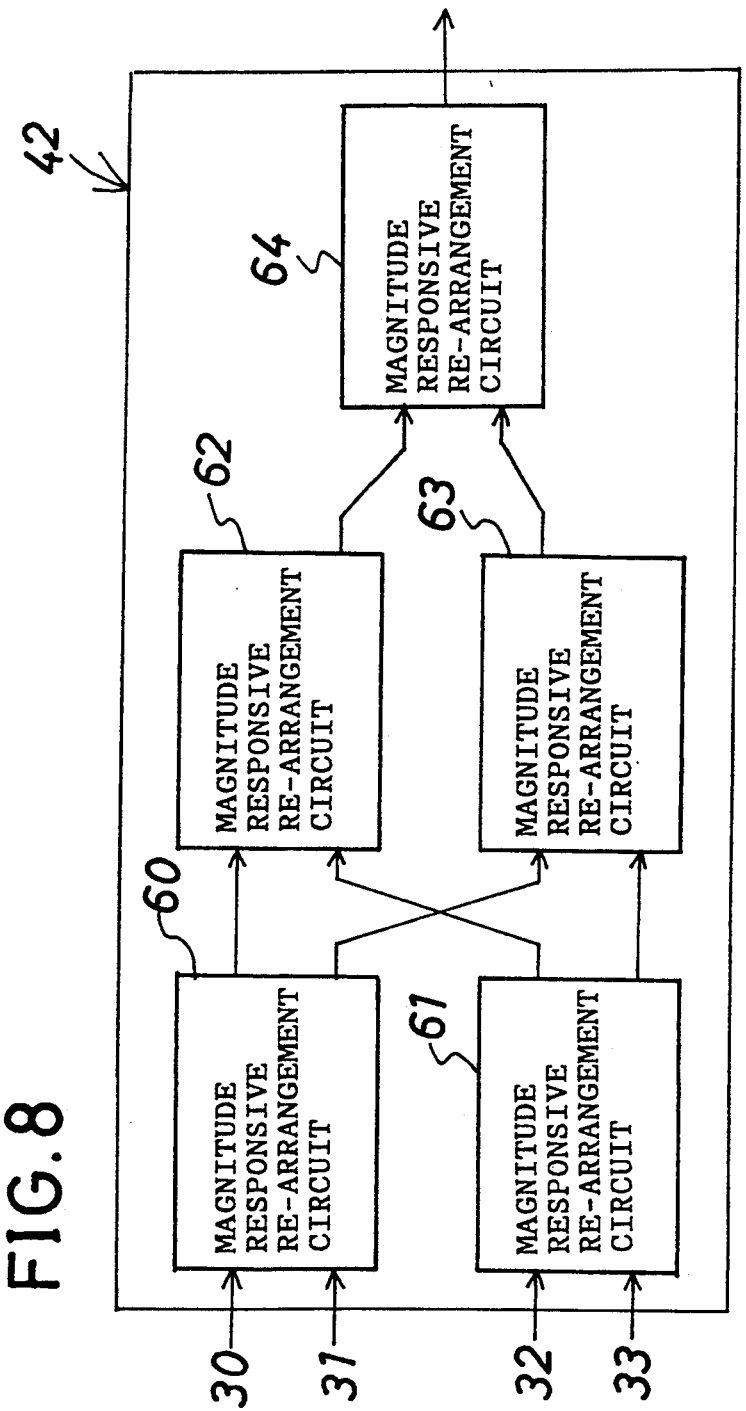
FIG. 8 is a block diagram of an interpolation calculation circuit of the image memory device shown in FIG. 7.

The interpolation calculation circuit 42 is shown more particularly in FIG. 8. Referring to FIG. 8, the interpolation calculation circuit 42 selects a single image data having a second highest level from four image data inputted at a time from the frame memories 30 to 33 and outputs the thus selected image data as interpolation data. To this end, the interpolation calculation circuit 42 includes a pair of magnitude responsive re-arrangement circuits 60 and 61 at a first stage, another pair of magnitude responsive re-arrangement circuits 62 and 63 at a second stage, and a single magnitude responsive re-arrangement circuit 64 at a third stage.

Each of the magnitude responsive re-arrangement circuits 60 to 64 is constructed in such a manner as shown in FIG. 9. Referring to FIG. 9, the magnitude responsive re-arrangement circuit shown includes a pair of latch circuits 65 and 66 for latching image data inputted to input terminals thereof, a single comparison circuit 67 for comparing magnitudes of image data latched in the latch circuits 65 and 66, and a switch box 68 for selectively outputting one of image data from the latch circuits 65 and 66 in response to a result of comparison by the comparison circuit 67. FIG. 10 illustrates a model of operation of the comparison circuit 67. In FIG. 10, the two inputs are denoted by "A" and "B", and the output which is a result of comparison in magnitude is denoted by "C". Meanwhile, operation of the switch box 68 is similar to that illustrated in FIGS. 4(A) and 4(B). In particular, the switch box 68 outputs a higher one of image data from the two latch circuits 65 and 66 from an output terminal 69 thereof and outputs the other lower image data from the other output terminal 70 thereof.

Referring back to FIG. 8, image data from the frame memories 30 and 31 are inputted to the two input terminals of the magnitude responsive re-arrangement circuit 60 while image data from the frame memories 32 and 33 are inputted to the two input terminals of the magnitude responsive re-arrangement circuit 61. One of the output terminals of the magnitude responsive re-arrangement circuit 60 from which a higher data is to be outputted is connected to one of the two input terminals of the magnitude responsive re-arrangement circuit 62 while the other output terminal from which a lower data is to be outputted is connected to one of the two input terminals of the magnitude responsive re-arrangement circuit 63. Meanwhile, one of the output terminals of the magnitude responsive re-arrangement circuit 61 from which a high data is to be outputted is connected to the other input terminal of the magnitude responsive re-arrangement circuit 62 while the other output terminal from which a lower data is to be outputted is connected to the other input terminal of the magnitude responsive re-arrangement circuit 63. Further, one of the output terminals of the magnitude responsive re-arrangement circuit 62 from which a lower data is to be outputted is connected to one of the two input terminals of the magnitude responsive re-arrangement circuit 64 while one of the output terminals of the magnitude responsive re-arrangement circuit 63 is connected to the other input terminal of the magnitude responsive re-arrangement circuit 63. Image data from one of the two output terminals of the magnitude responsive re-arrangement circuit 64 from which a higher data is to be outputted is outputted finally as interpolation data obtained from the interpolation calculation circuit 42. Such interpolation data corresponds to one of four image data outputted at a time from the frame memories 30 to 33 which has a second high level.

It is to be noted that the interpolation calculation circuit 42 can be constructed otherwise such that it selects one of four image data which has a third highest level and outputs it as interpolation data. Further, in place of the circuit construction wherein one of four image data is selected and outputted as it is as interpolation data, another circuit configuration may be employed wherein, for example, two image data of four image data which have second and third highest levels are selected and an average value between the two image data is calculated and outputted as interpolation data. Such concept can be applied similarly to interpolation for three neighboring points or for five or more neighboring points.

Having now fully described the invention, it will be apparent to one of ordinary skill in the art that many changes and modifications can be made thereto without departing from the spirit and scope of the invention as set forth herein.

What is claimed is:

1. An image memory device, comprising:
   an address generation circuit operable in response to an interpolation instruction inputted from an outside and including designation of a coordinate position for generating and outputting two-dimensional addresses corresponding to the coordinate position;
   a plurality of frame memories for temporarily storing image data at neighboring points around the coordinate position inputted from the outside and outputting, when conversion addresses are inputted thereto, those of the stored image data which correspond to the conversion addresses;
   a plurality of address decoders individually connected to said frame memories and connected commonly to said address generation circuit for converting the two-dimensional addresses inputted from said address generation circuit into addresses of said frame memories based on individually predetermined conversion rules different from one another and inputting the addresses obtained by the conversion in parallel to the corresponding ones of said frame memories at a time; and
   an interpolation calculation circuit for calculating and outputting interpolation data from the image data inputted at a time from said frame memories.

2. An image memory as claimed in claim 1, wherein said frame memories have an interleave construction which allows reading out and writing in units of a bank.

3. An image memory device, comprising:
   an address generation circuit operable in response to an interpolation instruction inputted from an outside and including designation of a coordinate position for generating and outputting two-dimensional addresses corresponding to the coordinate position;
   a plurality of frame memories for temporarily storing image data at neighboring points around the coordinate position inputted from the outside and outputting, when conversion addresses are inputted thereto, those of the stored image data which correspond to the conversion addresses;
   a plurality of address decoders individually connected to said frame memories and connected commonly to said address generation circuit for converting the two-dimensional addresses inputted from said address generation circuit into addresses of said frame memories based on individually predetermined conversion rules different from one another and inputting the addresses obtained by the conversion in parallel to the corresponding ones of said frame memories at a time;
   a data re-arrangement circuit connected commonly to said frame memories for re-arranging the order of the image data outputted at a time from said frame memories into a predetermined order based on the conversion addresses designating the image data and outputting the thus re-arranged image data in parallel at a time; and
   an interpolation calculation circuit for inputting the image data outputted at a time from said data re-arrangement circuit and the two-dimensional addresses, performing interpolation calculation in accordance with a predetermined operation expression based on the two-dimensional addresses using the image data and outputting thus obtained interpolation data.

4. An image memory device, comprising:
   an address generation circuit operable in response to an interpolation instruction inputted from an outside and including designation of a coordinate position for generating and outputting two-dimensional addresses corresponding to the coordinate position;
   a plurality of frame memories for temporarily storing image data at neighboring points around the coordinate position inputted from the outside and outputting, when conversion addresses are inputted thereto, those of the stored image data which correspond to the conversion addresses;
   a plurality of address decoders individually connected to said frame memories and connected commonly to said address generation circuit for converting the two-dimensional addresses inputted from said address generation circuit into addresses of said frame memories based on individually predetermined conversion rules different from one another and inputting the addresses obtained by the conversion in parallel to the corresponding ones of said frame memories at a time; and
   an interpolation calculation circuit for re-arranging the image data inputted at a time from said frame memories in an ascending order or a descending order in terms of levels of the image data and outputting one or ones of the image data at a predetermined order number or numbers as interpolation data.

5. An image memory device, comprising:
   an address generation circuit operable in response to an interpolation instruction inputted from an outside and including designation of a coordinate position for generating and outputting two-dimensional addresses corresponding to the coordinate position;
   a plurality of frame memories for temporarily storing image data at neighboring points around the coordinate position inputted from the outside and outputting, when conversion addresses are inputted thereto, those of the stored image data which correspond to the conversion addresses;
   a plurality of address decoders individually connected to said frame memories and connected commonly to said address generation circuit for converting the two-dimensional addresses inputted from said address generation circuit into addresses of said frame memories based on individually predetermined conversion rules different from one another and inputting the addresses obtained by the conversion in parallel to the corresponding ones of said frame memories at a time; and
   an interpolation calculation circuit for re-arranging the image data inputted at a time from said frame memories in an ascending order or a descending order in terms of levels of the image data and outputting an average value of a plurality of ones of the image data at predetermined order numbers as interpolation data.

* * * * *